Jan. 14, 1941.　　　　　R. J. FIELD　　　　2,228,948
SEAT COVER FOR MOTOR VEHICLES
Filed Jan. 4, 1938　　　3 Sheets-Sheet 3

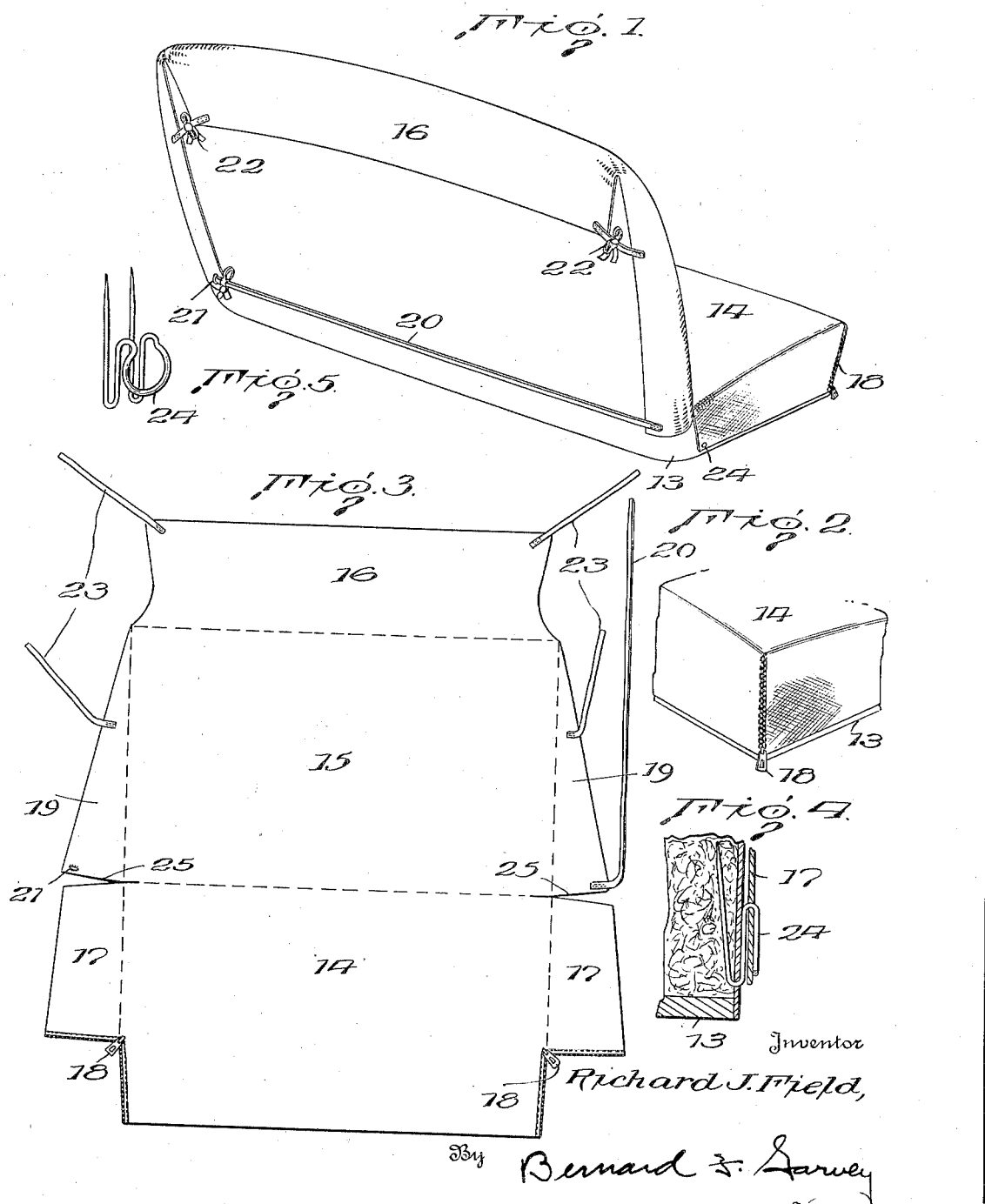

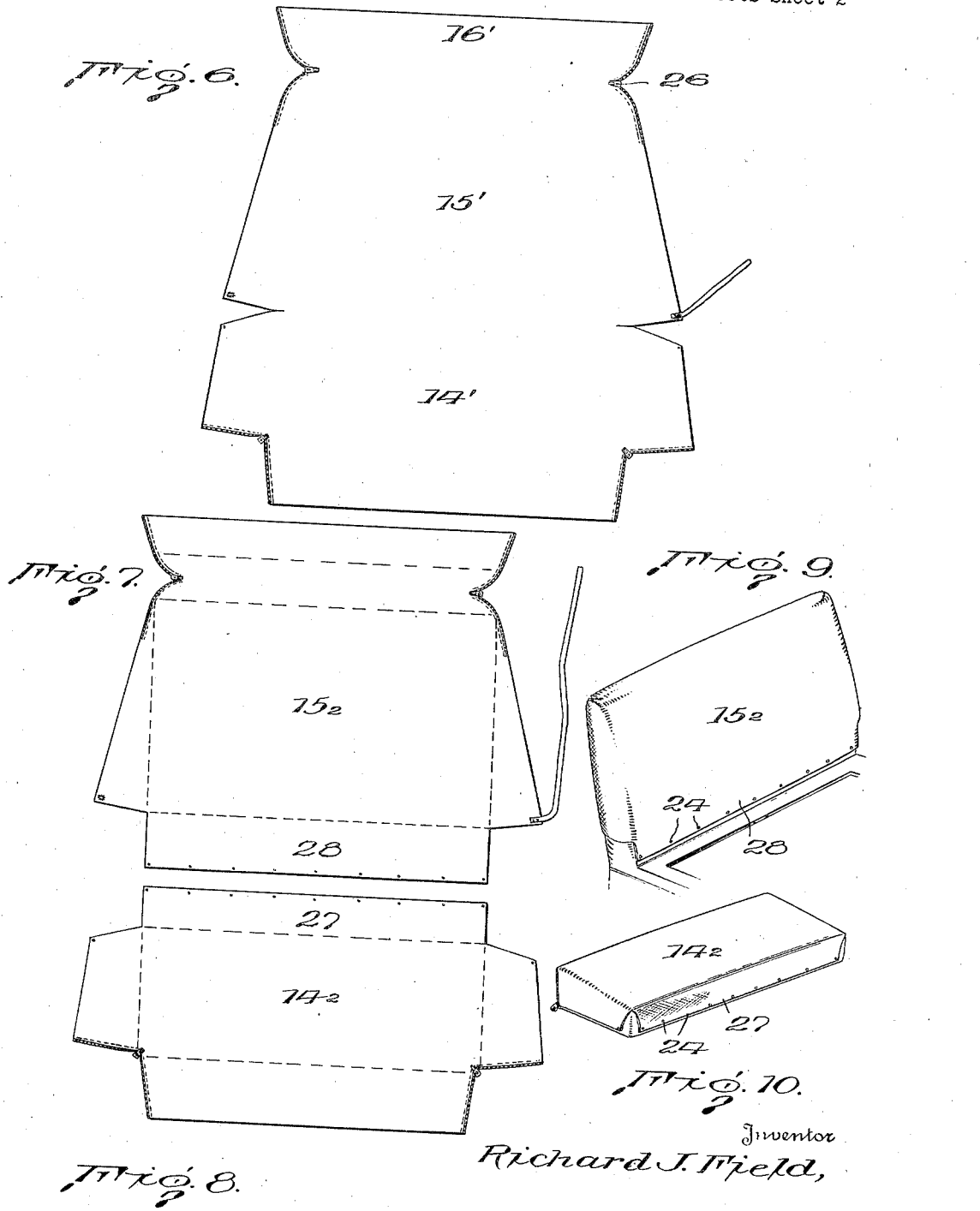

Inventor
Richard J. Field;
By Bernard T. Garvey
Attorney

Patented Jan. 14, 1941

2,228,948

UNITED STATES PATENT OFFICE 2,228,948

SEAT COVER FOR MOTOR VEHICLES

Richard J. Field, Baton Rouge, La.

Application January 4, 1938, Serial No. 183,361

1 Claim. (Cl. 155—182)

The present invention is a continuation in part of my prior application, Serial No. 145,131, filed May 27, 1937 for Seat covers for motor vehicles embodying improvements which I have found, after further experiment, provide a more practical and efficient cover which may be quickly and conveniently engaged with and disengaged from seats of modern motor vehicles.

It is within the contemplation of this invention to provide a unitary cover engageable over the seat and back, and likewise to provide a multipart cover, the parts being independently engageable over the seat and back and secured thereto in a novel manner.

Other objects will be manifest from the following description of the preferred forms of the invention herein illustrated, taken in connection with the accompanying drawings, wherein Fig. 1 is a perspective view of a motor vehicle front seat, looking from the rear of the latter, showing one form of seat and back cover, constructed in accordance with the present invention, applied thereto, Fig. 2 is a detail fragmentary perspective view of the seat per se illustrating the manner of securing the cover to the corner of the seat, Fig. 3 is a plan view of one form of cover in blank, Fig. 4 is a detail fragmentary sectional view of a seat per se illustrating the manner of securing one of the end flaps of the cover to an end of the seat, Fig. 5 is a perspective view of a form of pin used for securing portions of the cover to the seat, Fig. 6 is a plan view of another form of seat and back cover in blank, Fig. 7 is a similar view of still a further form of the invention adapted for application to the back only of the seat.

Figure 11:
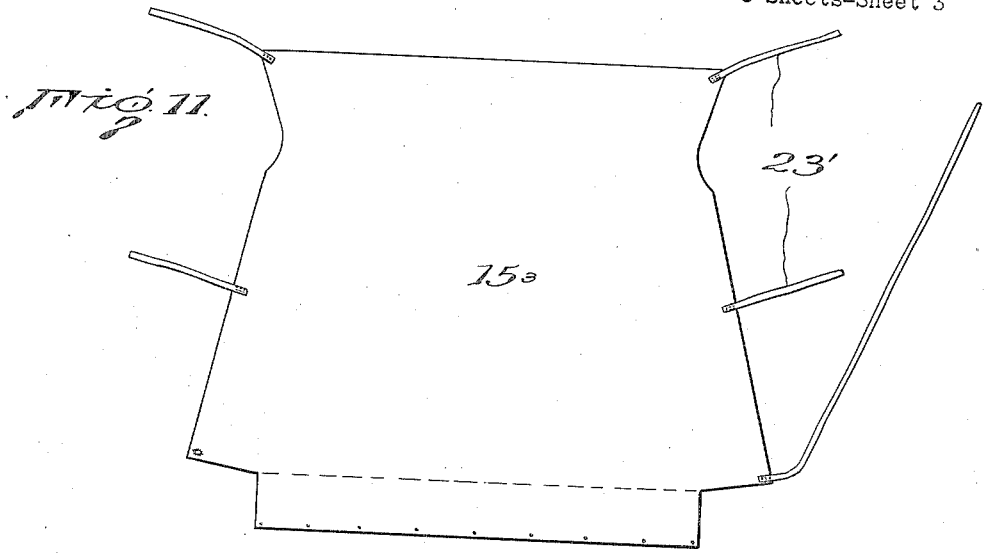
Figure 12:
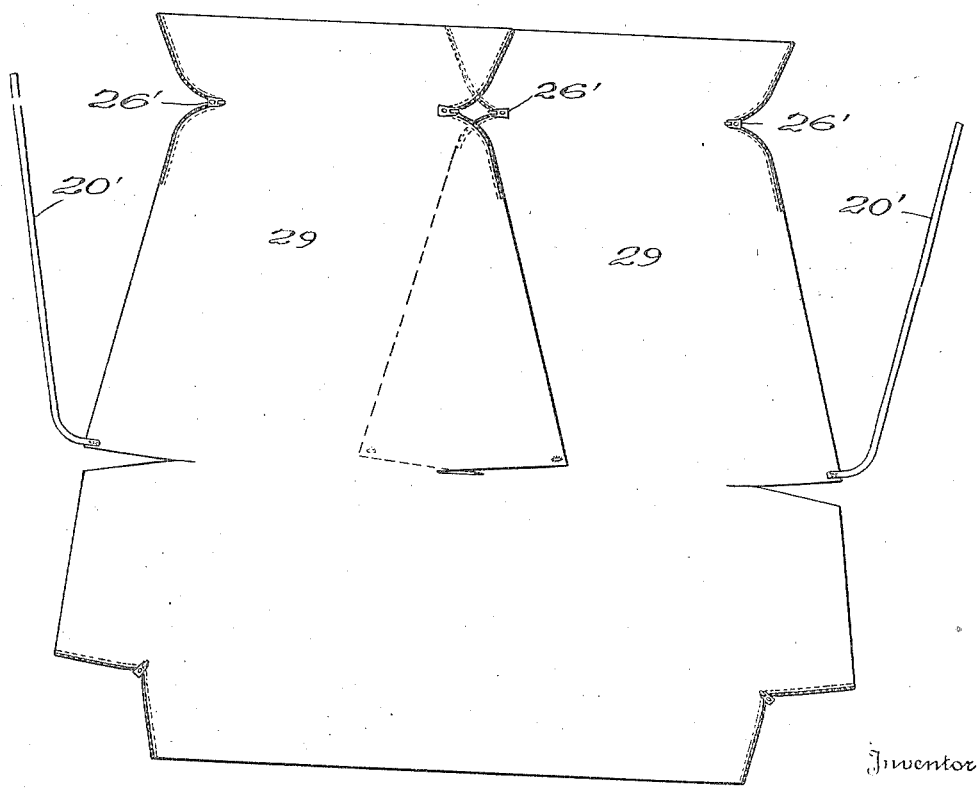

Fig. 8 is a plan view in blank of a seat cover adapted for engagement with the seat per se, Fig. 9 is a perspective view of a seat back illustrating the application of the form of invention shown in Fig. 7, Fig. 10 is a perspective view of a seat per se illustrating the application of the form of invention shown in Fig. 8, Fig. 11 is a plan view of a seat back cover in blank, this being a modified form of cover illustrated in Fig. 7, and Fig. 12 is a plan view of another modified form of cover in blank, adapted for use on a front seat having a divided back.

In the drawings, a seat, generally designated 13, is provided which is of conventional design and embodies a seat per se and an undivided seat back. A form of cover of the present invention is mounted on the seat which, as illustrated to advantage in Fig. 3, consists of a unitary body which is reversible to permit either side to be exposed. The lower portion 14 of the cover is adapted for engagement with the seat proper, an intermediate portion 15 being engageable with the front of the seat back, and an upper portion 16 engageable over the top of the seat back and engageable with the rear wall of the latter, as illustrated to advantage in Fig. 1. The bottom margin of the portion 14 terminates at or about the bottom of the seat. The ends of the portion 14 issue into flaps 17 which pend into engagement with the ends of the seat proper. The adjacent margins of the lower end of the portion 14 and the flaps 17 carry zipper fastening means 18 which may be actuated, in a manner well known in the art, to urge said margins into contiguity for snug engagement with the outer corners of the seat proper. The ends of the portion 15 of the cover issue into tapering side flaps 19 which extend around and are engageable with the ends of the seat back, as also illustrated to advantage in Fig. 1. When in use, the widened lower ends of the said flaps 19 are secured at the back of the seat by suitable means. In the present instance, for this purpose, I employ a tape or cord 20, one end of which is secured to the lower broadened end of one of the flaps 19, the opposite end of the tape being adapted for engagement in an eyelet or opening 21, formed in the broadened lower end of the opposite flap 19. The upper portion 16 of this form of blank is secured from displacement to the upper ends of the flaps 19 by suitable means 22. In the present instance the means is shown to consist of a pair of tabs 23, one of each pair of which has one end thereof secured to one of the flaps 19 near the upper end of the latter, while another of said tabs has one of its ends secured to the portion 16 of the cover at one of the corners of the latter, the free ends of the tabs being detachably engageable, as illustrated in Fig. 1. The inner ends of the flaps 17 may be secured to the ends of the seat proper by pins 24 or the like, the method of engagement being preferably as illustrated in Fig. 4 of the drawings. To provide the flaps 17 and 19 I have made V-shaped incisions 25 in the opposite margins of the seat, between the portions or sections 14 and 15. Preferably, the incisions extend inwardly to a point beyond the place of jointure between the flaps and the body sections, as illustrated to advantage in Fig. 3.

The form of invention illustrated in Fig. 6 is the same as that shown in Figs. 1 to 3, inclusive, except that the specific fastening means differs and correspondingly the upper end of the blank is modified to especially adapt the same for use with the particular type of fastener employed. In this form of invention the cover embodies lower, intermediate, and upper body portions or sections 14', 15' and 16' respectively. At the jointure of the sections or portions 15' and 16' the margins are rounded or arcuate and equipped with zipper fastening means 26. When the fasteners are secured, the top corners of the seat back will be snugly encased.

The form of invention shown in Figs. 7 to 10, inclusive, is similar to that shown in Fig. 6, except that instead of providing a unitary cover, as shown in Fig. 6, I provide, in said form of invention shown in Figs. 7 to 10, inclusive, a separate cover for the seat and back. The seat cover, generally designated 14², is identical with the body section 14, shown in Fig. 3, and body section 14', shown in Fig. 6, up to the point of jointure of said section with the intermediate body section. In the form of invention presently described, the rear margin of the section is extended to provide an oblong panel 27 which is adapted to extend downwardly and overlap the rear wall of the seat proper, as shown in Fig. 10. The panel 27 is anchored to the seat by suitable means, such as the pins 24. In this form of invention it will be noted that the length of the panel is coextensive with the length of the section 14², omitting the end panels of the latter. Consequently, when the cover is placed on the seat, the rear corners of the latter protrude through the space between the ends of the panel 27 and the adjacent terminals of the end flaps of the cover, as illustrated to advantage in Fig. 10.

The cover for the seat back, illustrated in this form of invention, is designed 15² and is the same as the sections 15' and 16', shown in Fig. 6, except that in this form the section 15² is equipped with an extension 28, which is adapted to extend downwardly to the end of the seat back to which it is secured by means of pins 24. When the seat, illustrated in Fig. 10, is in position, the extension 28 and pins mounted therein will be hidden from view. When the cover of the seat back is in place, it will be as shown in Fig. 9 in the drawings, the zipper fasteners causing the top of the cover to be urged snugly around the upper corners of the seat back.

In the form of the invention illustrated in Fig. 11, a cover 15³ is shown, which is adapted for use on a seat back, the same as shown in Figs. 7 and 9. The only difference between the presently described form and that illustrated in Fig. 7 is that instead of using a Zipper fastener, I prefer to employ securing tabs 23' which are used in the same manner as the tabs 23, illustrated in Fig. 3 of the drawings. I have found from experiment that certain materials shrink and others stretch and with such materials the Zipper fasteners cannot be satisfactorily used, especially for a prolonged period of time, after repeated washings of the cover. It is for this reason that fasteners, such as securing tabs, are illustrated to be used as an alternative form of fastener. Where the tabs are used there is a variation in the construction of the lateral margins of the upper ends of the covers, as illustrated in Figs. 3 and 11.

The form of invention illustrated in Fig. 12 is the same as that illustrated in Fig. 6, except that in the present form of invention the upper end of the cover is bifurcated to provide separate seat back engaging sections 29, adapted for use on divided front seats. In this form of invention a unitary cover is provided which fits over the seat proper in the same manner as the form of invention illustrated in Fig. 1. The sections 29 embrace the seat back and are secured thereto by the tapes 20' and Zipper fasteners 26'.

Although I have herein described certain preferred forms of the invention as are applicable to front seats of motor vehicles, nevertheless it is to be understood that various changes may be made in the cover to adapt the same for use with either front or back seats, within the scope of the claim hereto appended.

What is claimed is:

A reversible seat cover for motor vehicles including a body, a part of which is engaged with the vehicle seat and a part with the back of the seat, the lower end of the seat engaging part extending downwardly in front of the seat, the ends of the seat engaging part being extended to provide flaps pending in parallel relationship to the seat ends, fastening means on the body at the corners of the seat, means for anchoring the flaps to the ends of the seat, the back engaging part of said body having a portion extending over the top of the seat back and into engagement with the rear face of the latter, means to fasten said portion to extensions on the opposite ends of the back engaging portion of said body, and means engaged with the lower ends of said extensions at the rear of the seat back for holding the body in snug engagement with the seat back.

RICHARD J. FIELD.